United States Patent
Marcaccio et al.

(10) Patent No.: US 6,968,600 B2
(45) Date of Patent: Nov. 29, 2005

(54) DEVICE AND METHOD FOR ATTACHING A CONNECTION FITTING TO A CABLE DURING AIRBORNE RESCUE OPERATIONS

(75) Inventors: John D. Marcaccio, Mount Airy, NC (US); Arthur H. Walkley, Bedford Hills, NY (US)

(73) Assignee: Aerial Machine & Tool Corporation, Vesta, VA (US)

( * ) Notice: Subject to any disclaimer, the term of this patent is extended or adjusted under 35 U.S.C. 154(b) by 19 days.

(21) Appl. No.: 10/441,280

(22) Filed: May 20, 2003

(65) Prior Publication Data

US 2004/0231112 A1 Nov. 25, 2004

(51) Int. Cl.[7] .......................... A44B 17/00; F16G 11/00
(52) U.S. Cl. ........................................ 24/129 R; 24/130
(58) Field of Search ................ 24/129 R, 129 B, 24/130, 132 R, 132 AA, 18; 294/74, 82.1, 82.11; D8/382, 383; 182/3, 190, 241

(56) References Cited

U.S. PATENT DOCUMENTS

| 74,070 | A | * | 2/1868 | Fletcher .................... 24/129 R |
|---|---|---|---|---|
| 1,072,556 | A | | 9/1913 | Wood |
| 1,205,496 | A | | 11/1916 | Whitehead |
| 1,383,665 | A | | 7/1921 | Rohan |
| 1,390,152 | A | * | 9/1921 | Miltner .................... 24/129 R |
| 1,463,456 | A | | 7/1923 | Bear |
| 1,807,314 | A | | 5/1931 | Humphreys et al. |
| 2,174,192 | A | | 9/1939 | Meighan |
| 2,193,236 | A | | 3/1940 | Meighan |
| 2,229,935 | A | | 1/1941 | Powers |
| 2,305,688 | A | * | 12/1942 | Goddard .................... 24/129 R |
| 2,418,885 | A | | 4/1947 | Houston |
| 2,458,252 | A | | 1/1949 | Chatterton |
| 2,466,083 | A | | 4/1949 | Crosby |
| 2,595,806 | A | | 5/1952 | Morris |
| 3,309,745 | A | | 3/1967 | Gintz et al. |
| 3,579,746 | A | | 5/1971 | Marik |
| 3,675,276 | A | * | 7/1972 | Nuse ........................... 24/130 |
| 4,355,444 | A | | 10/1982 | Haney |
| D275,262 | S | | 8/1984 | Kimball |
| 4,809,408 | A | | 3/1989 | Abrahamson |
| 4,939,820 | A | | 7/1990 | Babcock |
| 5,136,756 | A | | 8/1992 | Krauss |
| 5,230,295 | A | | 7/1993 | Shell |
| 5,625,925 | A | | 5/1997 | Richards |
| 6,006,405 | A | | 12/1999 | Chou |
| 6,154,932 | A | | 12/2000 | Karg et al. |
| 6,317,935 | B1 | | 11/2001 | O'Rouke |

OTHER PUBLICATIONS

Information Disclosure Statement by John D. Marcaccio describing device observed prior to May 20, 2002.

* cited by examiner

*Primary Examiner*—Robert J. Sandy
(74) *Attorney, Agent, or Firm*—Banner & Witcoff

(57) ABSTRACT

A device for attaching a replacement hook or other fitting to the end of a hoist cable includes a main body with multiple cable-receiving slots formed in the lengthwise edges. An attachment point is formed on one end of the main body, and a switch-engaging member is attached to an opposing end of the main body. A cable is attached to the device by winding the cable around the main body and into the cable-receiving slots. When attached to a cable, the switch-engaging member is positioned to activate a cut-off switch of a hoist when the cable is fully retracted.

17 Claims, 8 Drawing Sheets

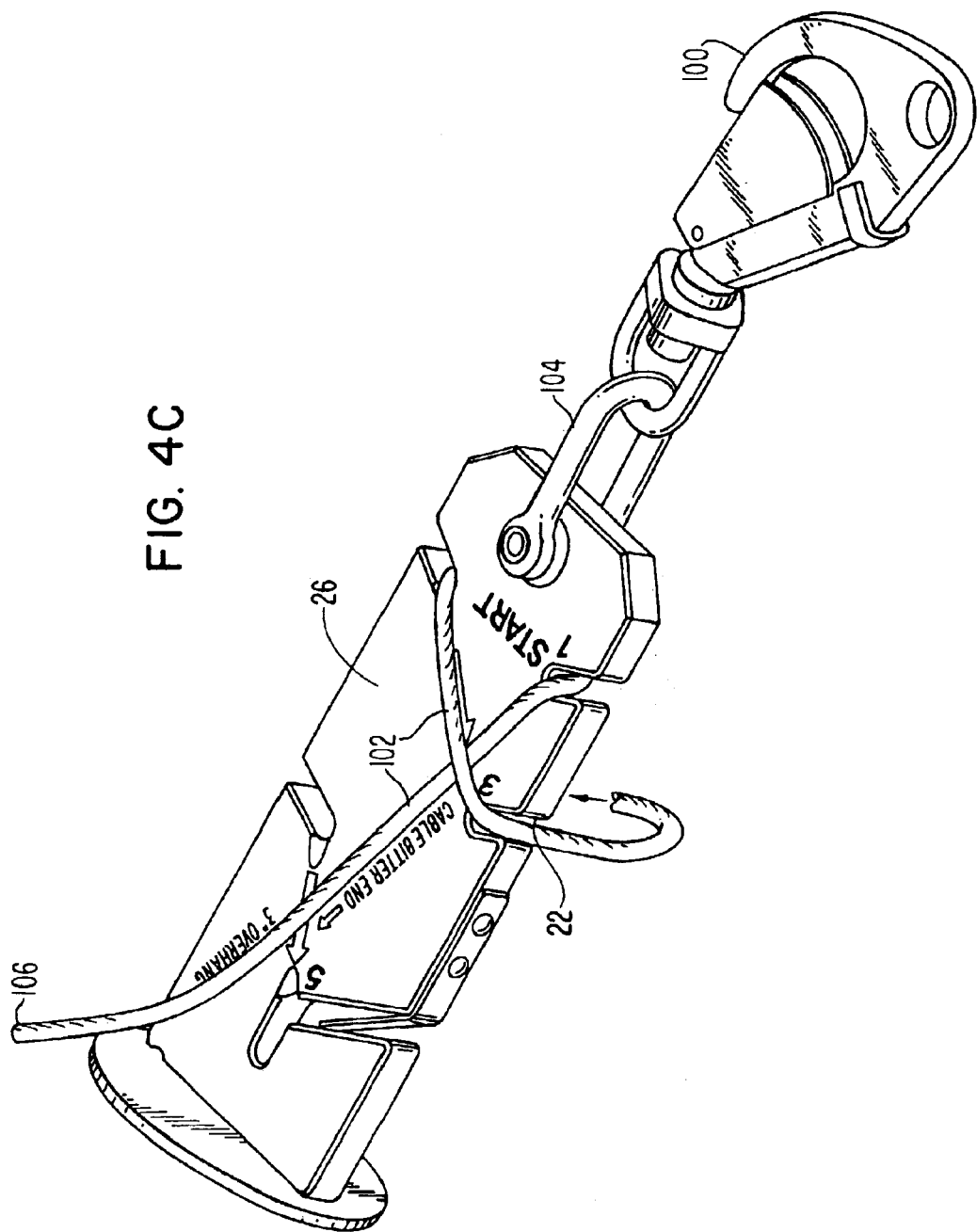

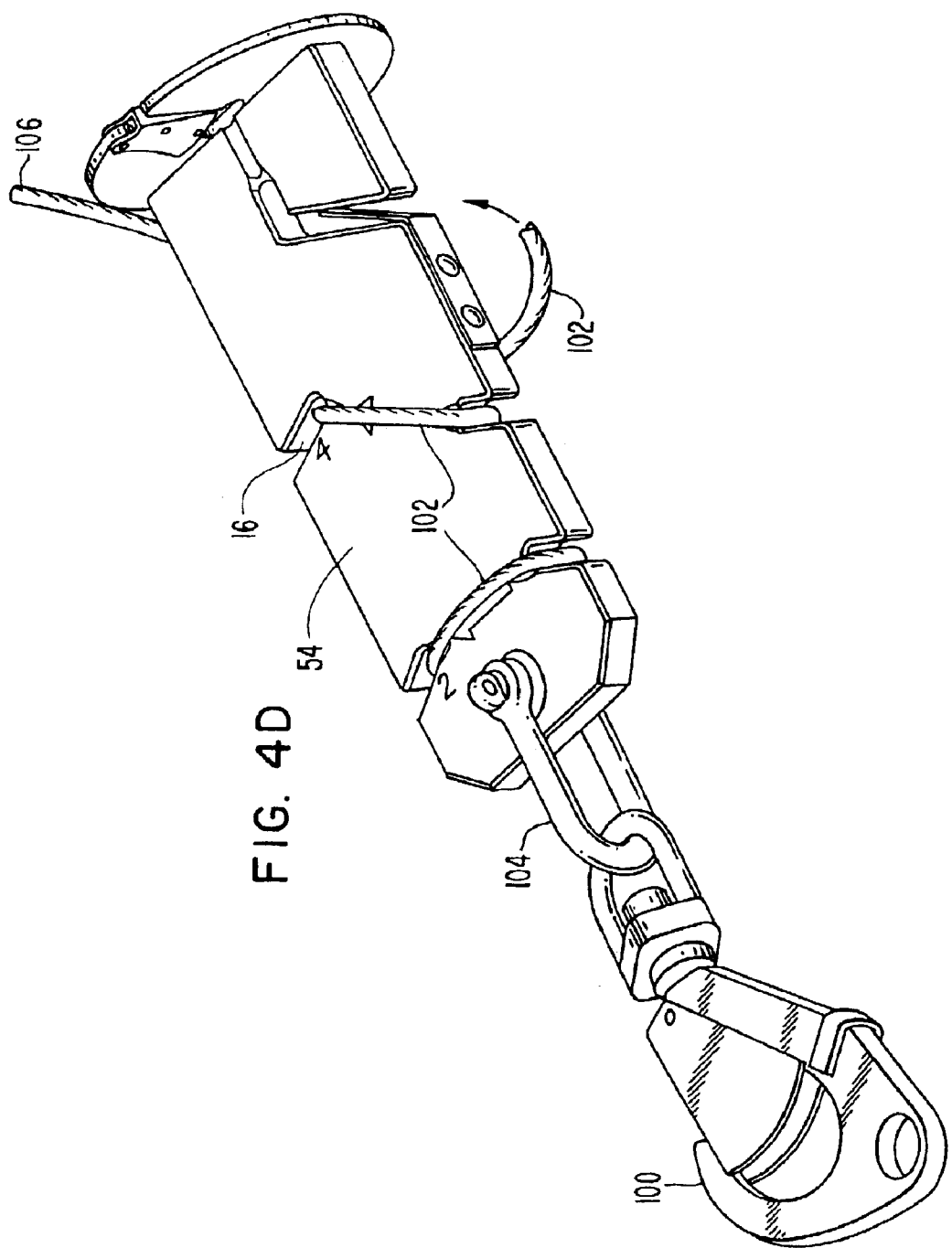

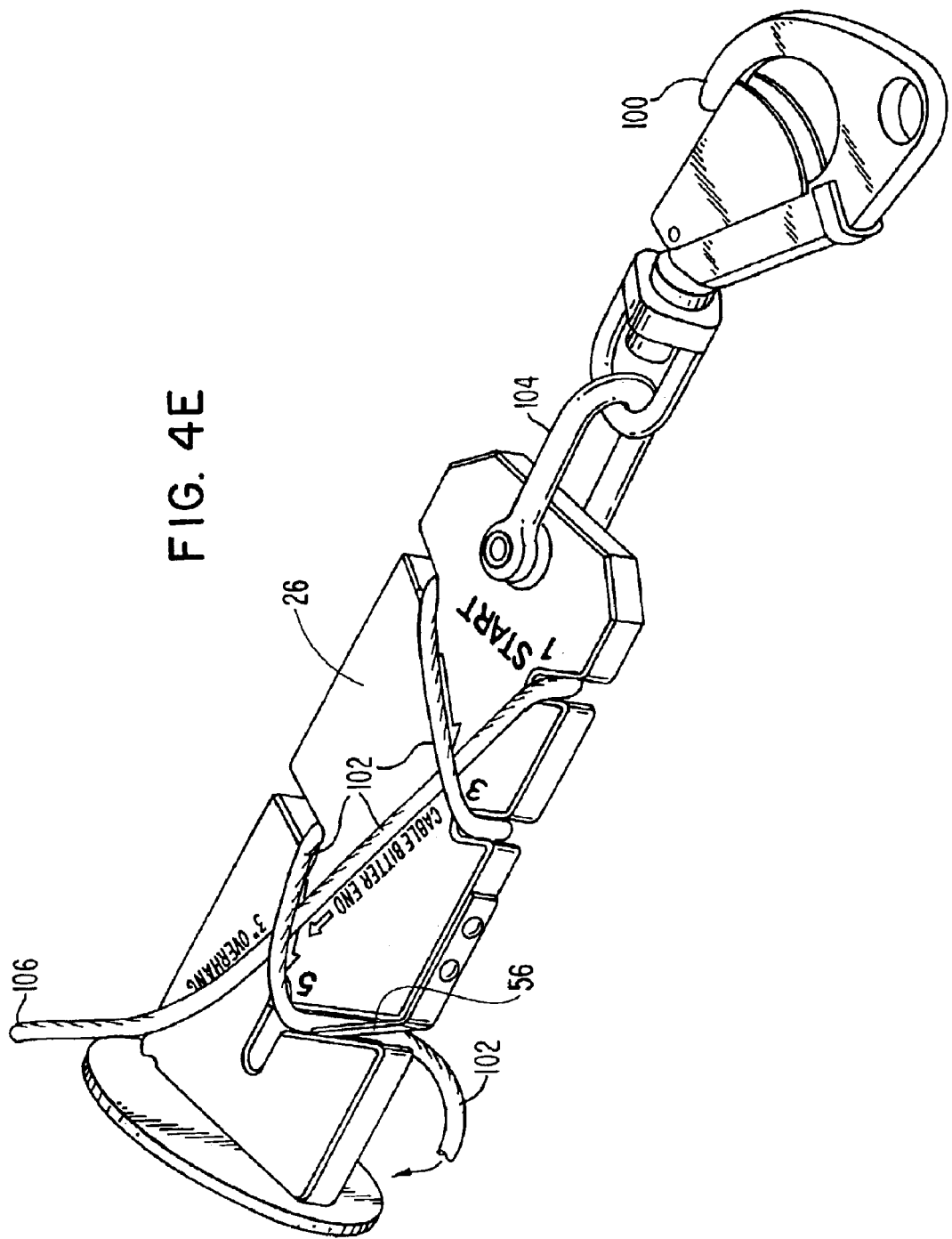

DEVICE AND METHOD FOR ATTACHING A CONNECTION FITTING TO A CABLE DURING AIRBORNE RESCUE OPERATIONS

FIELD OF THE INVENTION

This invention relates to cable fittings for use in airborne search and rescue operations. More particularly, this invention relates to a field cable splice adapted for use in helicopter rescue operations and to a method for attaching a connection fitting to a cable end while a helicopter is in flight.

BACKGROUND OF THE INVENTION

Helicopters are used to great advantage in Search and Rescue (SAR) operations. By conducting SAR operations from the air, greater distances can be searched, and otherwise inaccessible areas reached. Once an accident victim, downed airman or other person in need of assistance is located, the helicopter can then be used to retrieve that person. In many instances, it is not possible or safe for the helicopter to land. For example, the person to be rescued may be in the water and sea conditions may be too rough for the helicopter to land, or the helicopter may simply not be configured for water landing. When the person being rescued is on land, the helicopter may be unable land because of rugged terrain, trees, hostile ground forces, or other reasons. In such cases, a hoist in the helicopter can be used to lower a rescue hook, a harness, a basket or other retrieval device at the end of a cable, and then lift the rescued person up into the helicopter.

Typically, the hoist is located above a door or other ingress/egress point on the helicopter, and positioned so that the rescued person is at the same level with the door when the cable is completely taken up. So that the hoisting mechanism will not be jammed or damaged, it is necessary to shut off the hoist upon completion of the hoist operation, i.e., when the rescued person is at door level. An automatic limit switch or similar device is generally incorporated into the hoist for this purpose. A large plate, ball or other shape is typically located at the terminal end of the cable (i.e., just above the rescue hook or other mechanism for attachment to the person being rescued, or to the retrieval device). As the cable is hoisted up and the rescued person reaches the level of the helicopter door, the plate, ball or shape engages a contact on the hoist and trips the limit switch, thereby stopping the hoist.

On occasion, a rescue cable may become frayed or otherwise damaged, and the rescue hook (or other connection fitting) becomes unattached from the cable end. If there are remaining rescue operations to be performed, it is important that a replacement hook (or other connection fitting) be quickly and safely attached to the cable. It is also important that the automatic shut-off mechanism for the hoist remain operational. To date, however, there are no known devices that permit quick and simple attachment of a replacement hook under field conditions, while maintaining the operability of an automatic hoist shut-off.

SUMMARY OF THE INVENTION

The present invention addresses many of the problems of prior art devices described above. In particular, the present invention provides a device for attaching a replacement hook or other fitting to the end of a hoist cable, and includes an attached member for activating a switch. In one embodiment, the invention includes a main body that has a distal and a proximal end, with two lengthwise edges between the distal and proximal ends. The main body further has multiple cable-receiving slots formed in the lengthwise edges. Each slot extends from a slot entry located on an edge of the main body to a slot termination that is displaced from the slot entry toward an interior of the main body. Some of the cable-receiving slots having a termination that is closer to the proximal end and an entry that is closer to the distal end. An attachment point is formed on the distal end of the main body, and a switch-engaging member is attached to the proximal end of the main body. The switch-engaging member has an opening for receiving a cable. The opening is positioned to receive the cable from the termination of the cable-receiving slot closest to the proximal end.

In other aspects of the invention, indicia can be included on one or more portions of the main body, and the indicia can provide instructions for attaching the invention to a cable end. In aspects of the invention, a retainer may be included on a cable-receiving slot and/or on the opening in the switch-engaging member. Still other aspects of the invention include a method for attaching a connection point to a helicopter rescue hoist during airborne rescue operations. These and other aspects of the invention will be readily apparent and fully understood from the following detailed description of the preferred embodiment, taken in connection with the appended drawings.

BRIEF DESCRIPTION OF THE DRAWINGS

FIGS. 4A–4F are perspective views showing use of the cable splice assembly according of FIGS. 1–3 to attach a rescue hook to a bitter end of a cable.

DETAILED DESCRIPTION OF THE PREFERRED EMBODIMENTS

Figure 1:
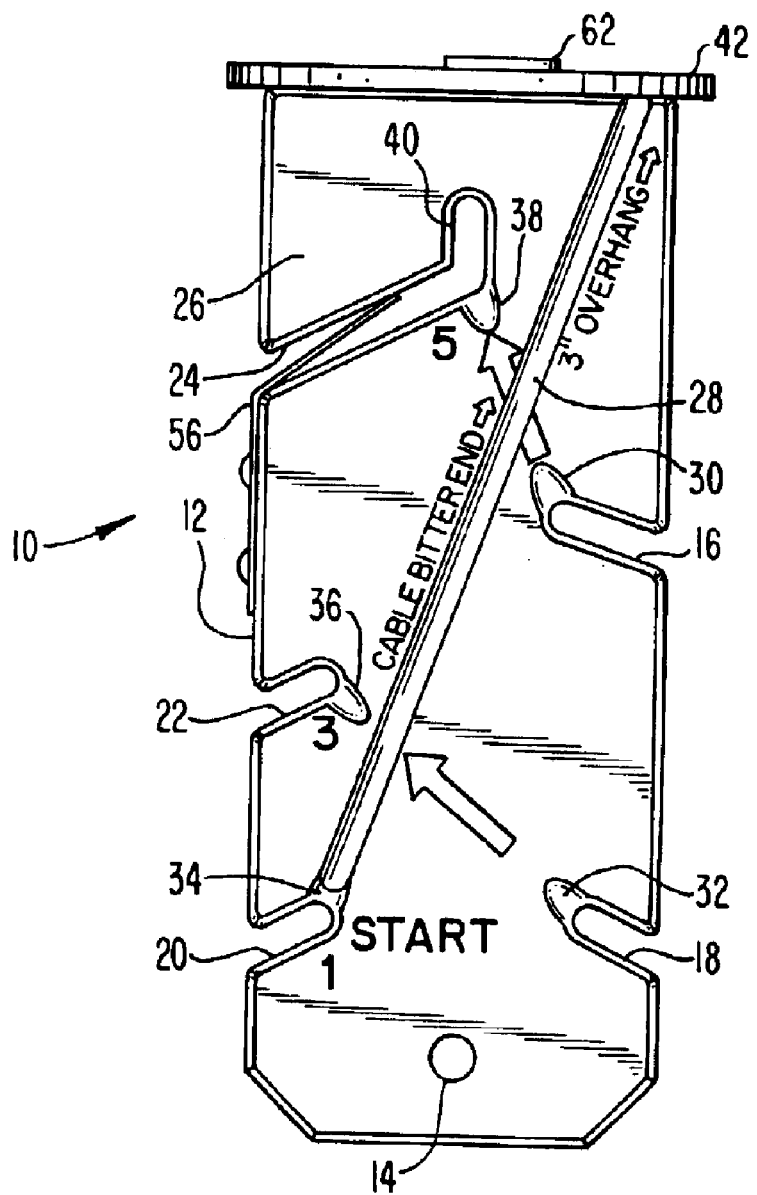
FIG. 1 is a front view of a cable splice assembly according to one embodiment of the invention.

FIG. 1 is a front view of a cable splice assembly 10 according to one embodiment of the invention. Splice assembly 10 includes a main body portion 12 that is generally planar in form. Formed on the distal (or rescue) end of the main body portion 12 is hole 14. Also formed in main body portion 12 are a series of slots 16, 18, 20, 22 and 24. Slots 16–24 are sized to accommodate a wire rope rescue cable, and are angled toward the proximal (or hoist) end of the main body portion 12. In other words, the opening of each slot (located on an edge of the main body portion 12) is closer to the distal end, while the termination of each slot (located toward the interior of main body portion 12) is closer to the proximal end. Formed in the front face 26 of main body portion 12 is groove 28. Groove 28 extends from the termination of slot 20, diagonally across face 26, and toward the hoist end of the splice assembly 10. Formed near the terminations of slots 16–24 are scallop-shaped relief notches 30, 32, 34, 36 and 38. Also formed at the interior end of slot 24 is slot extension 40 extending toward the hoist end of the splice assembly 10. Various indicia ("1," "START," various arrows, etc.) may also be stamped, engraved, painted or otherwise formed on front face 26. The function of such indicia is further described herein.

Attached to the hoist end of main body portion 12 is limit switch-engaging plate 42. As is more clearly shown in FIGS.

3–4F, switch-engaging plate 42 is also generally planar, and is attached so as to be generally perpendicular to main body portion 12. In other embodiments, a different shape could be attached to the hoist end of main body portion 12 and configured to engage a hoist limit switch. As but one example, a hemispherical shape having a flat face and a round face could be attached to main body 12 at the flat face, with the round face configured to engage a limit switch.

Figure 2:
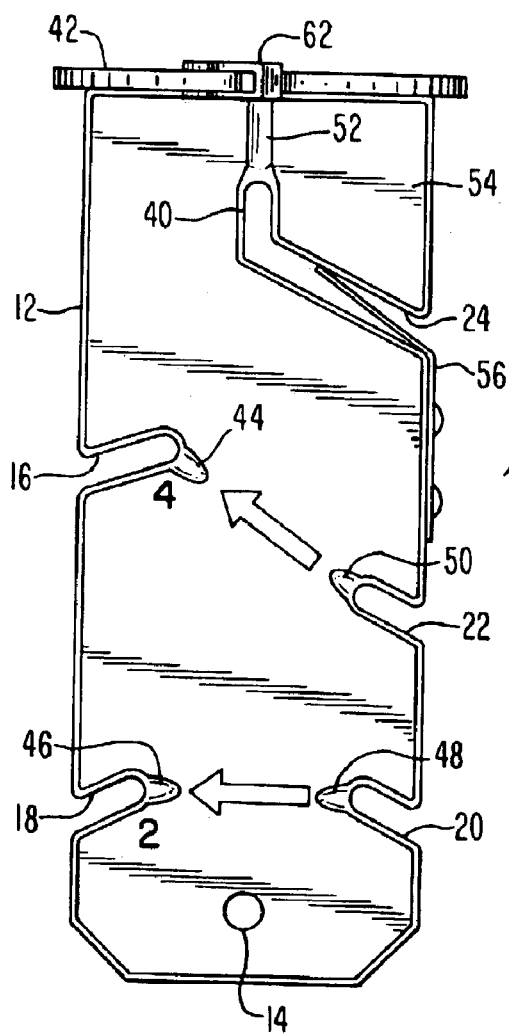
FIG. 2 is a rear view of a cable splice assembly according to one embodiment of the invention.

FIG. 2 is a rear view of splice assembly 10. Scallop-shaped relief notches 44, 46, 48 and 50 are respectively formed in rear face 54 near the terminations of slots 16, 18, 20 and 22. Formed at the termination of slot 24 (i.e., at the end of slot extension 40) and extending toward engaging plate 42 is a groove 52. Various indicia ("2," "4," various arrows) are also formed on face rear 54 of main body portion 12. One end of a flexible cable retainer 56 is fastened along the edge of main body 12 near the opening of slot 24. Cable retainer 56 may be fastened to an edge of main body portion 12 with screws as shown, or in another convenient manner. Another end of cable retainer 56 extends into slot 24.

Figure 3:
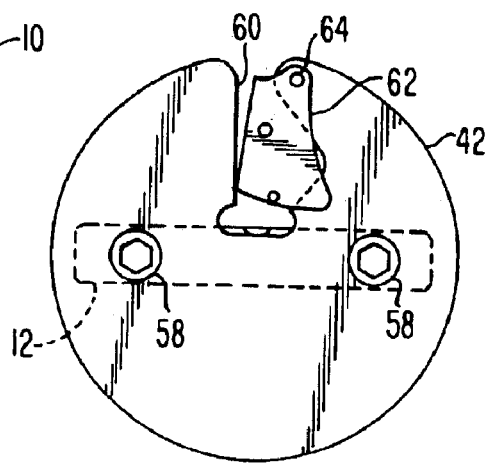
FIG. 3 is a top view of a cable splice assembly according to one embodiment of the invention.

FIG. 3 is a top view of splice assembly 10. Switch-engaging plate 42 is disk shaped and attached to a top edge of main body portion 12 with a pair of countersunk screws 58. Switch-engaging plate 42 could alternatively be attached to main body 12 with other types of mechanical fasteners, by welding, or in another manner. An opening 60 extends inward from the outer perimeter of switch-engaging plate 42 and terminates near the center of switch-engaging plate 42. A cable gate 62 is pivotally attached at pin 64 to a point on the mouth of opening 60. Gate 62 is biased by a spring (not shown) to obstruct the entrance to opening 60 from the edge of switch-engaging plate 42. Gate 62 is configured such that it is pushed open by a cable pushed into opening 60 past the edge of switch-engaging plate 42, but such that it will prevent a cable from exiting the opening past the same edge.

Figure 4A:
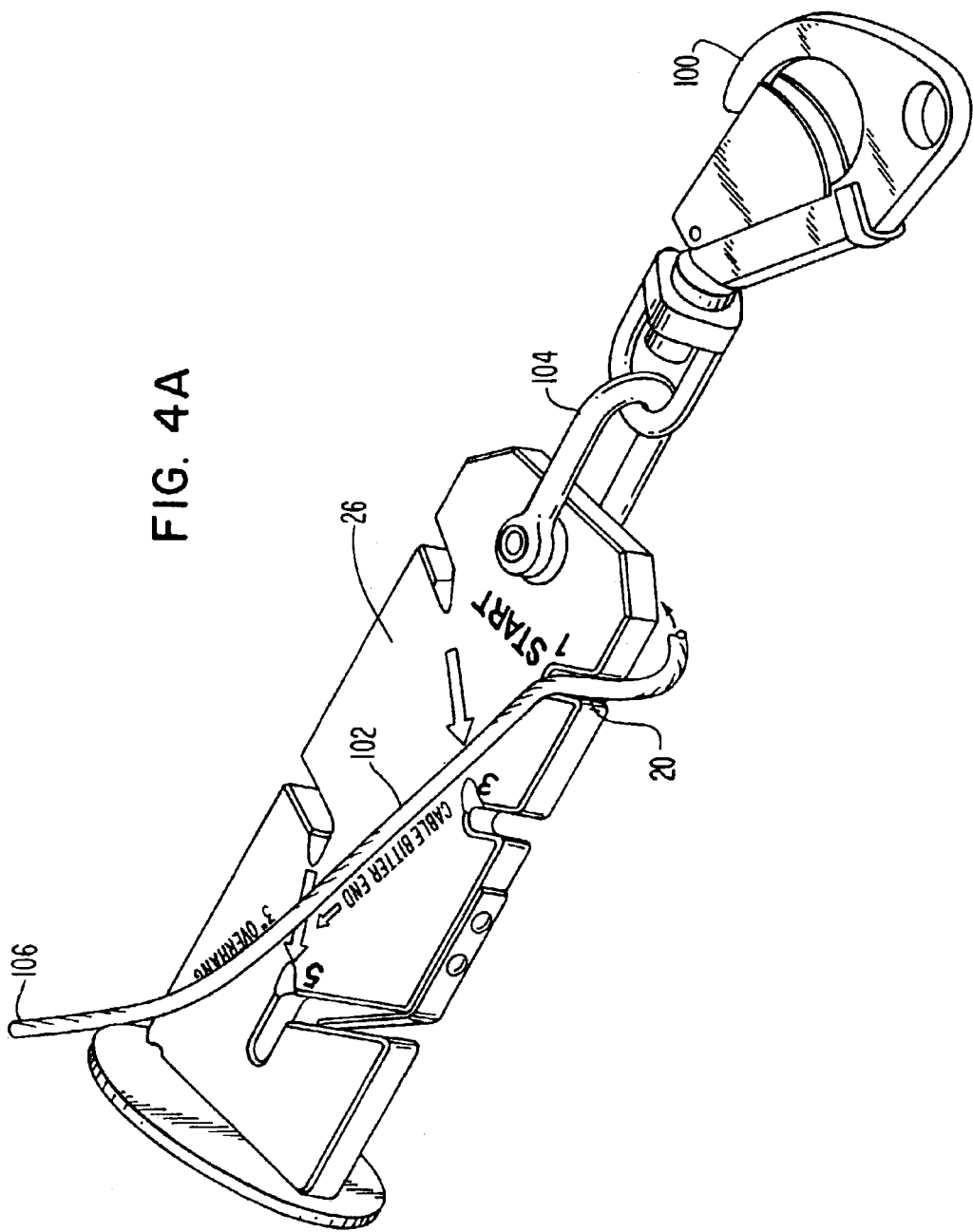
Figure 4B:
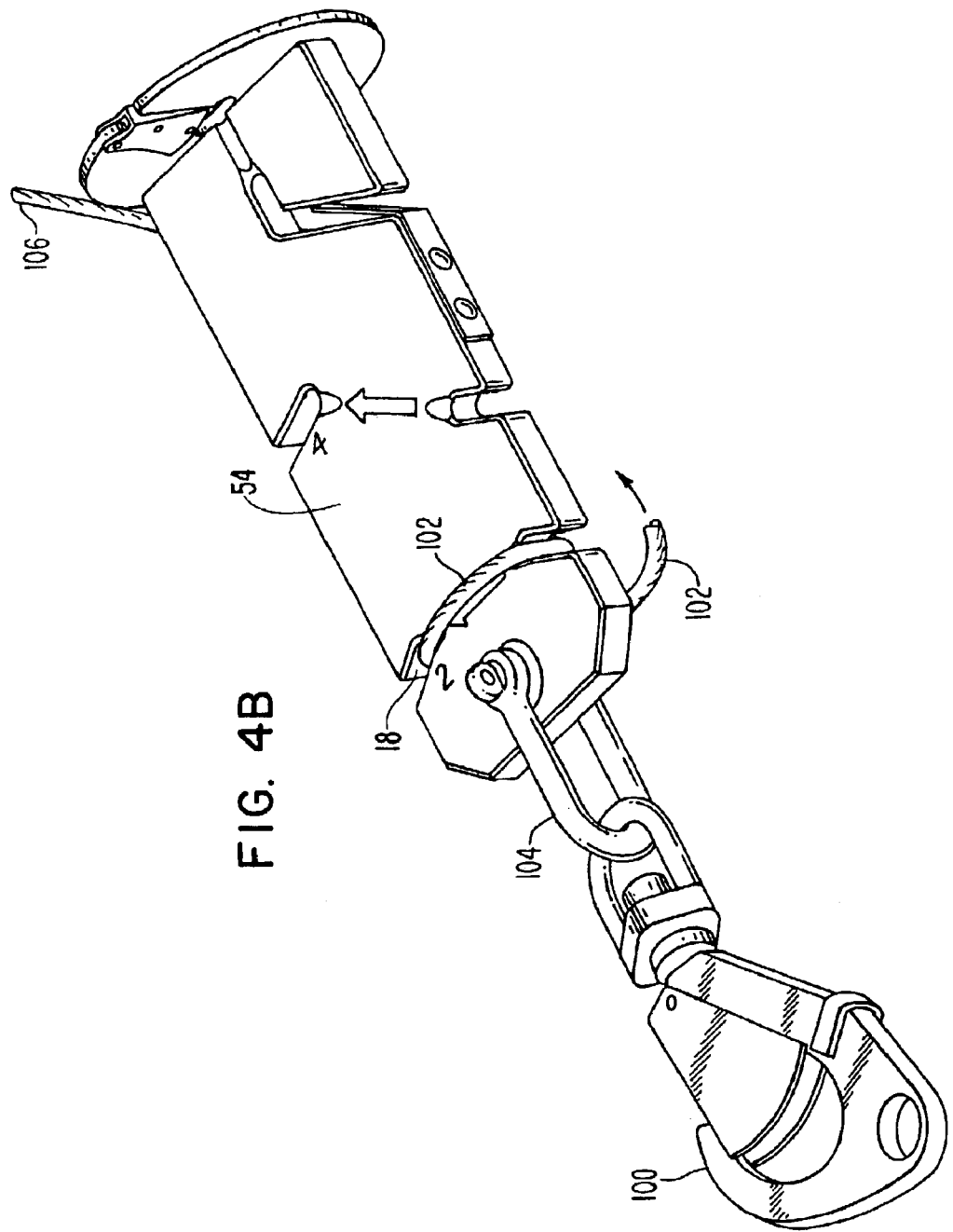

FIGS. 4A–4F show use of splice assembly 10 to attach a rescue hook 100 to the bitter end of a cable 102. One example of a suitable rescue hook that can be used with the splice assembly of the invention is described in U.S. Pat. N0. 6,363,589, assigned to the assignee of the present invention, Other types of rescue hooks and connection fittings could also be used with the splice assembly of the invention. Rescue hook 100 is attached to splice assembly 10 with a shackle 104. As shown in FIG. 4A, an operator first positions splice assembly 10 such that cable 102 is resting in groove 28. Cable 102 is positioned with the bitter end 106 at the hoist end of splice assembly 10, and with approximately 3 inches of cable overhanging beyond the hoist end of splice 10. Instructions are placed on the front face 26 of main body 12 that guide the operator in placing the cable. Holding the cable in slot 28 with a thumb or finger, the operator then winds the cable 102 around an edge of main body portion 12 and into slot 20. A "1" and "START" on the front face 26 inform the operator to wind the cable in this manner. As shown in FIG. 4B, the operator next winds the cable across rear face 54, over the opposing edge of main body portion 12 and into slot 18. An arrow pointing from slot 20 to slot 18 and/or a "2" may be placed on the rear face 54 to inform the operator to proceed in this manner. Next, as shown in FIG. 4C, the operator winds the cable back across front face 26, over the first edge of main body portion 12, and into slot 22. An arrow pointing from slot 18 to slot 22 and/or a "3" may be placed on the front face 26 to further inform the operator to proceed in this manner.

After winding the cable 102 around main body 12 through slot 22, the operator next winds the cable 102 across rear face 54, around the opposing edge of main body portion 12, and into slot 16, as shown in FIG. 4D. An arrow from slot 22 to slot 16 and/or a "4" near slot 16 further instruct the operator in this regard. Next, as shown in FIG. 4E, the operator winds the cable 102 from slot 16 back across front face 26 (over the portion of cable 102 lying in groove 28), around the first edge of main body portion 12, and into slot 24. An arrow pointing from slot 16 to slot 24 and/or a "5" near slot 24 provide instructions to the operator on this step of the procedure. Upon moving the cable 102 into slot 24 and past retainer 56, retainer 56 prevents cable 102 from exiting slot 24 by moving past the edge of main body portion 12. The end of retainer 56 inside of slot 24 is biased to a position that closes the entry into slot 24 from the edge of main body 12. As cable 102 moves past retainer 56, retainer 56 bends to allow passage of cable 102 into slot 24, and then returns to a position closing slot 24. Although a single strip of flexible metal (such as, e.g., stainless steel) is shown, other types of retainers could be utilized. For example, a gate similar to gate 62 could be placed near the entrance to slot 24. As but one other possible example, a close-fitting plastic insert could be fitted at the entrance of slot 24. Other components and/or mechanisms configured to allow passage of a cable into slot 24 from the edge of main body portion 12, but to prevent exit past the same edge, could alternatively be used.

Figure 4F:
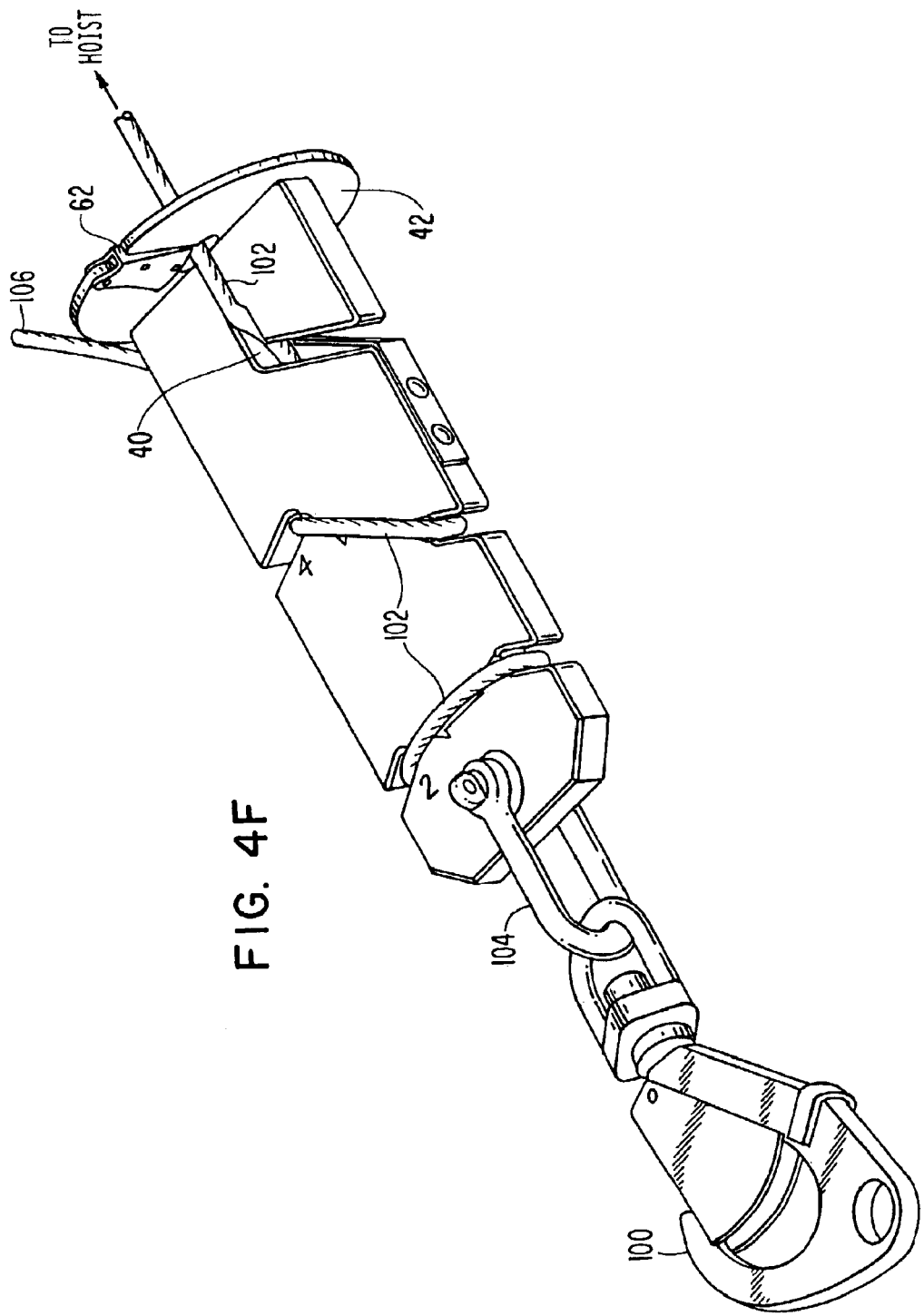

FIG. 4F shows the final step in attachment. After passing into slot 24, the cable 102 is pulled up into extension 40. Cable 102 is then pulled into opening 60 of switch activating plate 42, past gate 62, and into position generally near the center of plate 42. Cable 102 rests in groove 52 (extending from extension 40 to plate 42) and generally lies along the longitudinal centerline of the splice assembly 10. Cable 102, with attached splice assembly and hook 100, can now be used in rescue operations. Friction between cable 102 and the main body 12 prevent cable 102 from pulling out of splice assembly 10. Retainer 56 and gate 62 prevent cable 102 from unwinding from splice assembly 10.

In one preferred embodiment, main body portion 12 and switch activation disk 42 are machined from 6061-T6 aircraft grade aluminum. Other materials can be used, including but not limited to stainless steel. When sized for a 0.19 inch cable, slots 16–24 are nominally 0.26 inches wide and main body 12 is 0.5 inches thick.

Although specific examples of carrying out the invention have been described, those skilled in the art will appreciate that there are numerous variations and permutations of the above described systems and techniques that fall within the spirit and scope of the invention as set forth in the appended claims. In addition to examples provided above, various other materials may be used and dimensions varied. The indicia shown on the front and rear faces of main body portion 12 are merely examples of possible instructions that could be placed on a splice assembly according to the invention. Other indicia could be provided in addition to, or as an alternative to, the information shown. These and other modifications are within the scope of the invention as defined by the attached claims.

What is claimed is:

1. A device for attaching a connection fitting to an end of a cable, comprising:
a main body having distal and proximal ends and two lengthwise edges between the distal and proximal ends, the main body further having
multiple cable-receiving slots, each of said slots having a slot entry on one of said lengthwise edges and a slot termination displaced proximally from the slot entry and toward an interior of the main body, and an attachment point formed on the distal end; and a switch-engaging member attached to the proximal end of the main body, the switch-engaging member having an opening formed therein for receiving a cable, the opening being positioned to receive the cable from the termination of the cable-receiving slot nearest the proximal end, wherein the switch-engaging member is a plate attached to the main body so as to be substantially perpendicular to a longitudinal axis of the main body.

2. The device of claim 1, wherein the main body further comprises indicia formed on at least one portion thereof providing instructions for attachment of the device to a cable end.

3. The device of claim 1, wherein at least one of the multiple cable-receiving slots has a slot entry on a first of the two lengthwise edges and at least one of the multiple cable-receiving slots has a slot entry on a second of the two lengthwise edges.

4. A device for attaching a connection fitting to an end of a cable, comprising:

a main body having distal and proximal ends and two lengthwise edges between the distal and proximal ends, the main body further having multiple cable-receiving slots, each of said slots having a slot entry on one of said lengthwise edges and a slot termination displaced proximally from the slot entry and toward an interior of the main body, and an attachment point formed on the distal end;

a switch-engaging member attached to the proximal end of the main body, the switch-engaging member having an opening formed therein for receiving a cable, the opening being positioned to receive the cable from the termination of the cable-receiving slot nearest the proximal end; and a shackle attached to the attachment point and a hook coupled to the shackle.

5. A device for attaching a connection fitting to an end of a cable, comprising:

a main body having distal and proximal ends and two lengthwise edges between the distal and proximal ends, the main body further having multiple cable-receiving slots, each of said slots having a slot entry on one of said lengthwise edges and a slot termination displaced proximally from the slot entry and toward an interior of the main body, and an attachment point formed on the distal end; and a switch-engaging member attached to the proximal end of the main body, the switch-engaging member having an opening formed therein for receiving a cable, the opening being positioned to receive the cable from the termination of the cable-receiving slot nearest the proximal end, wherein at least 5 cable-receiving slots are formed in the main body, and wherein the main body is substantially in the form of a plate.

6. A device for attaching a connection fitting to an end of a cable, comprising:

a main body having distal and proximal ends and two lengthwise edges between the distal and proximal ends, the main body further having multiple cable-receiving slots, each of said slots having a slot entry on one of said lengthwise edges and a slot termination displaced proximally from the slot entry and toward an interior of the main body, and an attachment point formed on the distal end;

a switch-engaging member attached to the proximal end of the main body, the switch-engaging member having an opening formed therein for receiving a cable, the opening being positioned to receive the cable from the termination of the cable-receiving slot nearest the proximal end; and a retainer positioned on at least one of the multiple cable-receiving slots and configured to allow passage of a cable into the at least one multiple cable-receiving slot past an edge of the main body, and to prevent exit of the cable past the same edge.

7. The device of claim 6, wherein the retainer comprises a flexible metal strip having one end fastened to an edge of the main body near an opening of the at least one slot, and another end positioned within the at least one slot.

8. A device for attaching a connection fitting to an end of a cable, comprising:

a main body having distal and proximal ends and two lengthwise edges between the distal and proximal ends, the main body further having multiple cable-receiving slots, each of said slots having a slot entry on one of said lengthwise edges and a slot termination displaced proximally from the slot entry and toward an interior of the main body, and an attachment point formed on the distal end;

a switch-engaging member attached to the proximal end of the main body, the switch-engaging member having an opening formed therein for receiving a cable, the opening being positioned to receive the cable from the termination of the cable-receiving slot nearest the proximal end; and a retainer positioned on the switch-engaging member opening and configured to allow passage of a cable into the opening past an edge of the switch-engaging member, and to prevent exit of the cable past the same edge.

9. The device of claim 8, wherein the retainer comprises a gate pivotally attached to the switch-engaging plate, the gate being biased to close the opening.

10. A device for attaching a connection point to an end of a cable, comprising:

a main body plate having distal and proximal ends, two lengthwise edges between the distal and proximal ends, and a front and rear face, the main plate further having a plurality of cable-receiving slots formed in the lengthwise edges, an attachment point formed on the distal end, and indicia formed on front and rear faces providing instructions for use of the device, the instructions including the order in which a cable should be should be placed into the cable-receiving slots;

a switch-engaging plate attached to the proximal end of the main body plate, the switch-engaging plate further being substantially perpendicular to the main plate, having on opening formed therein for receiving a cable, the opening being positioned to receive the cable from the cable receiving slot nearest the proximal end, and comprising a retainer configured to allow passage of a cable into the opening past an edge of the switch-engaging plate but prevent exit of the cable past the same edge; and a hook coupled to the attachment point.

11. The device of claim 10, wherein:

the main body plate comprises at least five cable-receiving slots, each slot extends from a slot entry on an edge of the main body plate to a slot termination displaced from the slot entry toward an interior of the main body plate, a plurality of the cable-receiving slots having a termination that is closer to the proximal end and an entry that is closer to the distal end, and the termination of an upper slot nearest the proximal end and a termination point of the switch-engaging plate opening each lie substantially along a longitudinal centerline of the device.

12. The device of claim 11, wherein the slot nearest the proximal end further comprises a slot extension substantially aligned with the longitudinal centerline, and wherein the termination of the upper slot is at the end of the slot extension.

13. A method for attaching a connection point to a helicopter rescue hoist during airborne rescue operations, comprising:

providing an attachment device, the attachment device having:

a main body having distal and proximal ends and two lengthwise edges between the distal and proximal ends, the main body further having multiple cable-receiving slots formed in the lengthwise edges and extending toward an interior of the main body, a hook coupled to the distal end, and a switch-engaging member attached to the proximal end of the main body, the switch-engaging member sized to actuate a hoist shut-off control, the switch-engaging member further having an opening extending from an outer edge of the member toward the center thereof;

positioning the attachment device on a bitter end of a helicopter rescue hoist cable while the helicopter is in flight;

sequentially winding the cable around the main body and into the cable-receiving slots; and routing the cable through the opening in the switch-engaging member such that the cable extends from the switch-engaging member to the hoist, and such that the hook is available for attachment to an object to be lowered from or lifted to the helicopter by the hoist.

14. The method of claim 13, further comprising following attachment instructions formed on the main body.

15. The method of claim 13, wherein providing an attachment device comprises providing an attachment device having a substantially plate-shaped main body and at least five cable-receiving slots.

16. A device for attaching a connection fitting to an end of a cable, comprising:

a main body having distal and proximal ends and two lengthwise edges between the distal and proximal ends, the main body further having multiple cable-receiving slots, each of said slots having a slot entry on one of said lengthwise edges and a slot termination displaced proximally from the slot entry and toward an interior of the main body, and an attachment point formed on the distal end; and a switch-engaging member attached to the proximal end of the main body, the switch-engaging member having an opening formed therein for receiving a cable, the opening being positioned to receive the cable from the termination of the cable-receiving slot nearest the proximal end, wherein the main body further comprises indicia formed on at least one portion thereof providing instructions for attachment of the device to a cable end.

17. The device of claim 16, wherein the indicia are formed on front and rear faces of the main body and include instructions providing the order in which a cable should be wound into the multiple cable-receiving slots.

* * * * *